Figure 1:
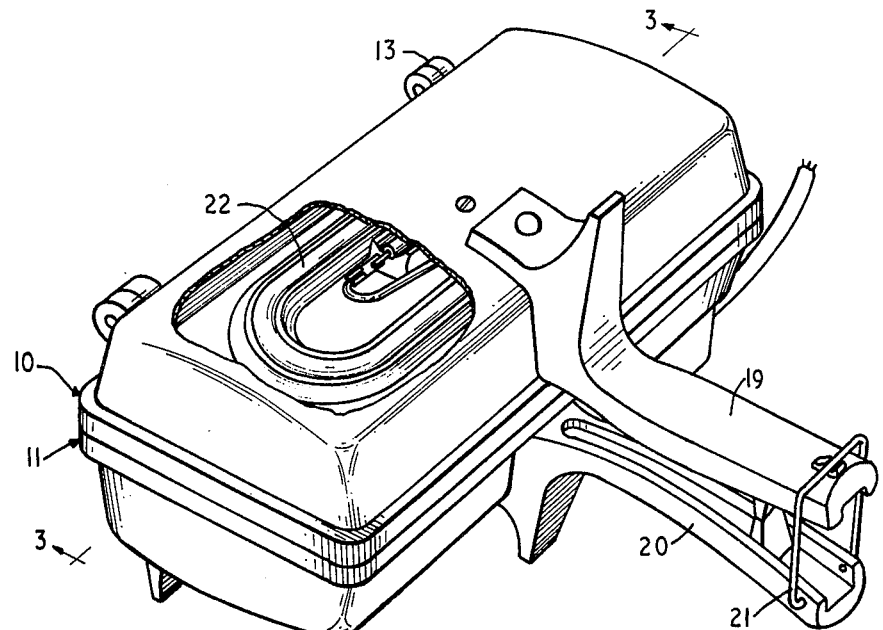

United States Patent [19]

Wheeler

[11] 4,091,720
[45] May 30, 1978

[54] SANDWICH TOASTING APPARATUS

[75] Inventor: Richard George Wheeler, Killara, Australia

[73] Assignee: Breville Holdings Pty. Ltd., Pyrmont, Australia

[21] Appl. No.: 793,273

[22] Filed: May 3, 1977

[30] Foreign Application Priority Data

May 4, 1976 Australia .............................. PC5810
Nov. 11, 1976 Australia .............................. PC8103

[51] Int. Cl.² ............................................. A47J 37/00
[52] U.S. Cl. ....................................... 99/375; 99/430; 219/524
[58] Field of Search ................. 99/375, 372, 374, 378, 99/331, 383, 394, 426, 424, 430; 219/524, 525

[56] References Cited

U.S. PATENT DOCUMENTS

| 1,692,644 | 11/1928 | Fromkneaht | 99/375 X |
| 3,007,595 | 11/1961 | Remley | 99/426 |
| 3,108,531 | 10/1963 | Jepson | 219/524 |
| 3,121,385 | 2/1944 | Funke | 99/374 |

Primary Examiner—Edward J. McCarthy

[57] ABSTRACT

A sandwich toasting apparatus having two mould halves which form at least one cavity between them when brought together to receive and compress the peripheral edges of a sandwich consisting of two slices of bread having a filling therebetween, and an electric heater associated with said mould halves to heat said sandwich and toast the exterior thereof. Each mould half has at least one transverse rib extending into the mould cavity with a flat face which is positioned so as to be adjacent the flat face of the rib in the other mould half when the mould halves are closed, whereby said ribs act as scissor blades to progressively sever the sandwich and seal the severed edges.

4 Claims, 3 Drawing Figures

SANDWICH TOASTING APPARATUS

The present invention relates to improvements in sandwich toasting apparatus, the object of the invention being to provide sandwich toasting apparatus of increased effectiveness in that it produces a product that is more convenient to handle and eat.

It is known to toast the sandwiches by means of a pair of moulds usually of aluminium that are hingedly connected at one side and that between them define a cavity adaped to receive two pieces of bread one on top of the other with a filling of meat or other foodstuffs between the slices of bread. The edges of the moulds are constructed to come together closely when the halves of the mould are closed so that the edges of the two pieces of bread are pressed tightly together. The mould halves are held together and then heated either electrically or by other means to toast the pieces of bread and heat the filling. The removal of the pieces of bread is usually facilitated by buttering the outer surfaces so that the exterior of the sandwich is to some extent fried as well as toasted.

Such known devices have generally speaking been constructed to have a cavity of such a size as to receive one standard sized rectangular piece of bread. In some cases the mould is made slightly smaller than the bread so that the crusts of the bread protrude beyond the edges of the mould halves and are severed or partially severed during the toasting operation.

The present invention consists in a sandwich toaster of the kind described wherein the mould is designed so as to have extending diagonally or transversely across each mould half a rib arranged so that when the halves of the mould are brought together under pressure the ribs are brought together in the manner of the blades of a pair of scissors and act progressively to bisect the sandwich and during the toasting operation to seal the severed edges.

Figure 2:
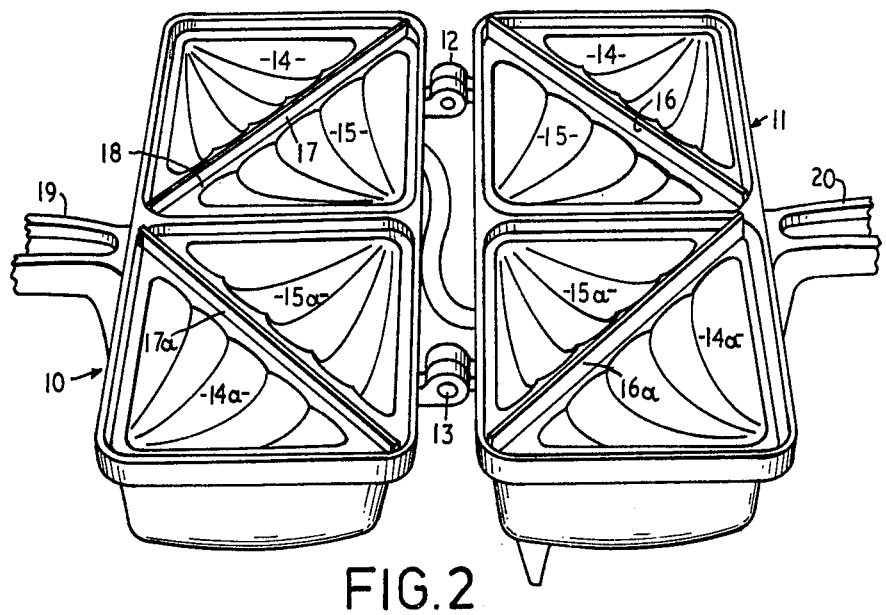
Figure 3:
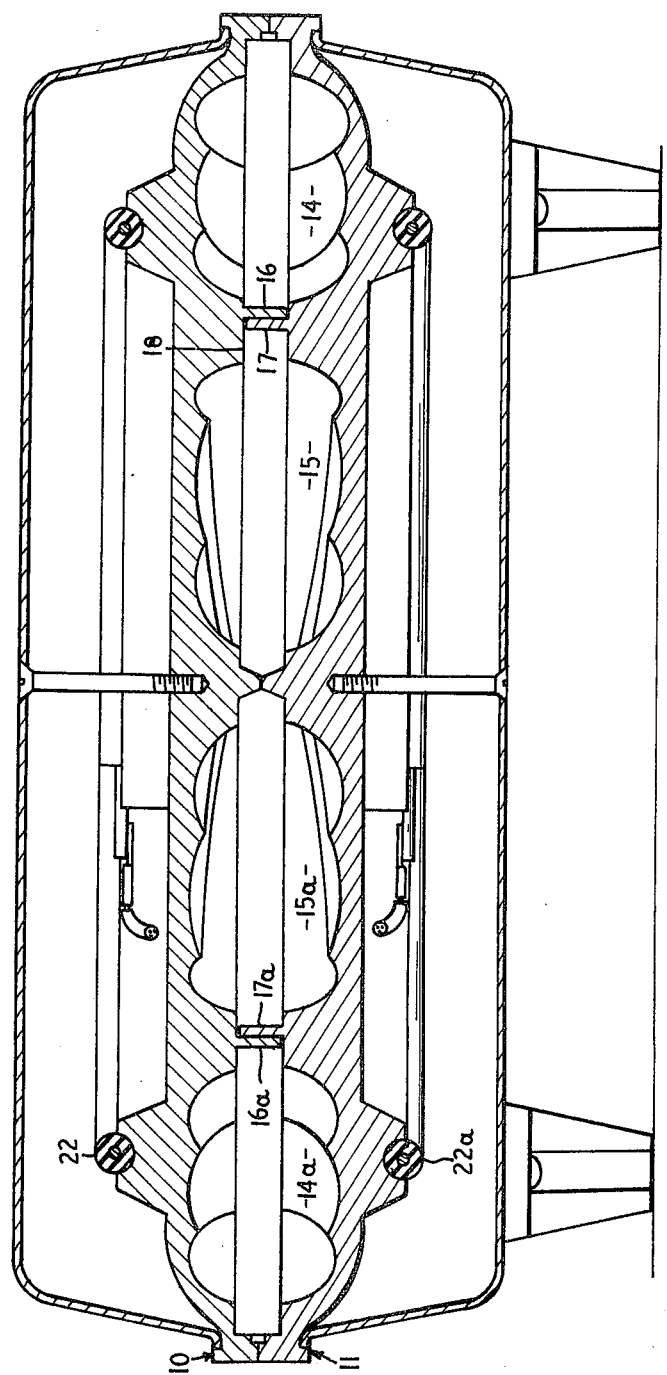

In order that the nature of the invention may be better understood a preferred form of the invention is hereinafter described by way of example with reference to the accompanying drawings in which:

FIG. 1 is a perspective view of a sandwich toaster according to the invention, in a closed position, FIG. 2 is a view of the toaster of FIG. 1 in a fully open position, portion of the handles being omitted and FIG. 3 is a section of the toaster on the line 3—3 of FIG. 1.

In the preferred form of the invention shown in the accompanying drawing two mould halves 10 and 11 are joined by hinges indicated at 12 and 13. This form of the invention is intended for toasting simultaneously two sandwiches each consisting of two standard square slices of bread. Each mould half defines, in respect of each sandwich to be toasted, what are in effect two separate mould half cavities indicated as 14 and 15 and 14a and 15a. Each half cavity has a scalloped shape the purpose of which is to provide a finished article having an attractive appearance. The two half cavities 14 and 15 in mould half 11 are divided by a rib 16 which is such that when the mould halves 10 and 11 are closed it will be brought progressively alongside the corresponding rib 17 in mould half 10 and between them they will act to sever the sandwich in the manner of the blades of a pair of scissors and seal the severed edges. The ribs 16a and 17a of the half cavities 14a and 15a act in a similar manner.

The relationship between the ribs 16 and 17 and 16a and 17a is best seen in FIG. 3. From this it can be seen that the ribs are of narrow section and of a depth such that their free edges come very close to a flat face such as 18 in mould half cavity 15 of mould half 10 when the toaster is closed. While it is desirable that the free edge of each rib 16, 16a, 17 and 17a shall come as close as possible to the other mould half when the toaster is closed some tolerance has to be allowed to take account of inevitable inaccuracies in production.

The ribs 16 and 17 and 16a and 17a are arranged so that their adjacent faces are substantially flat and come together with a 'scissors' action as the mould halves are closed and it is found that this provides a superior severing action to divide the toasted sandwich into two substantially equal parts even when the sandwich filling consists of a slice or slices of meat. The fact that the ribs have some lateral thickness and meet a flat face of the other mould half assists in sealing the cut edges of the sandwich halves.

The remaining structure of the toaster is shown clearly in the drawings and as it is largely of a conventional nature will not be specifically described. It is to be noted that in the particular form of the invention shown in the drawings the ribs 16 and 16a are arranged on the outer sides of the ribs 17 and 17a, the purpose of this being to balance any lateral forces produced during the closing of the mould. It has been found that if this is not done there is a slight tendency for one mould half to be displaced laterally in relation to the other.

In use a sandwich (not shown) consisting of two standard sized square pieces of bread with a filling between them, the outer surfaces of the bread being buttered, are placed into each part of the mould half 11. The mould half 10 is then folded over on top of the mould half 11 and the two clamped together by means of the handles 19 and 20 and clip 21. Toasting is then effected by means of a thermostatically controlled electric heater 22 and 22a which has preferably been switched on for some time before the sandwich is placed in the toaster to allow the mould halves to reach working temperature. The mould halves are held together for a predetermined time that is readily found by experience and on releasing the pressure and opening the mould halves it is found that what are, in effect, four toasted sandwiches, are left in the mould half 11, the two halves of each sandwich being either completely separated or readily separable. Each triangular half sandwich is sealed around its edges thus completely enclosing the filling. It has been found that the half sandwiches produced are much more convenient to eat than a whole sandwich and have a more attractive appearance.

While in the embodiment illustrated the ribs 16 and 17 extend diagonally they may extend transversely and if so desired they may be curved in shape.

The embodiment of the invention described above is given by way of example only. Toasters may, for example, be constructed with a substantial number of double cavities for use in commercial establishments and it is not necessary that the two mould halves be hinged together; one mould half may be mounted for linear movement in relation to the other, suitable means being provided for pressing the two mould halves together and holding them together during the toasting process.

I claim:

1. Sandwich toasting apparatus consisting of two mould halves constructed and arranged to be brought together to form between them at least one cavity shaped to receive and compress the peripheral edges of a sandwich consisting of two slices of bread having a filling between them placed in one of said mould halves; electric heating means associated with said mould halves to heat said sandwich and toast the exterior thereof and means to retain said mould halves in a closed position; characterized in that each mould half is provided with at least one transverse rib extending into the mould cavity when said mould halves are brought together, the said ribs each having a flat face positioned so as to be adjacent the flat face of the rib in the other mould half when said moulds are brought together after the manner of the blades of a pair of scissors to sever progressively a sandwich in said toasting apparatus and to seal the severed edges.

2. Sandwich toasting apparatus as claimed in claim 1 wherein each said rib is of narrow section and of such a depth as to approach closely to a face of the other mould half when the mould halves are in a closed position.

3. Sandwich toasting apparatus as claimed in claim 1, wherein each cavity is rectangular in form to accommodate a standard rectangular slice of bread, and each rib is arranged to extend diagonally across the cavity, whereby each sandwich is bisected into two triangular portions.

4. Sandwich toasting apparatus as claimed in claim 1, wherein there are a plurality of mould cavities and the ribs of one mould half are arranged on the outer sides of the ribs of the other mould half so that any forces tending to produce relative lateral movement of the mould halves during closing of the apparatus are balanced out.

* * * * *